No. 869,258. PATENTED OCT. 29, 1907.
W. L. PAUL.
CASTER CONTROLLER FOR WHEELED PLOWS.
APPLICATION FILED SEPT. 27, 1906.
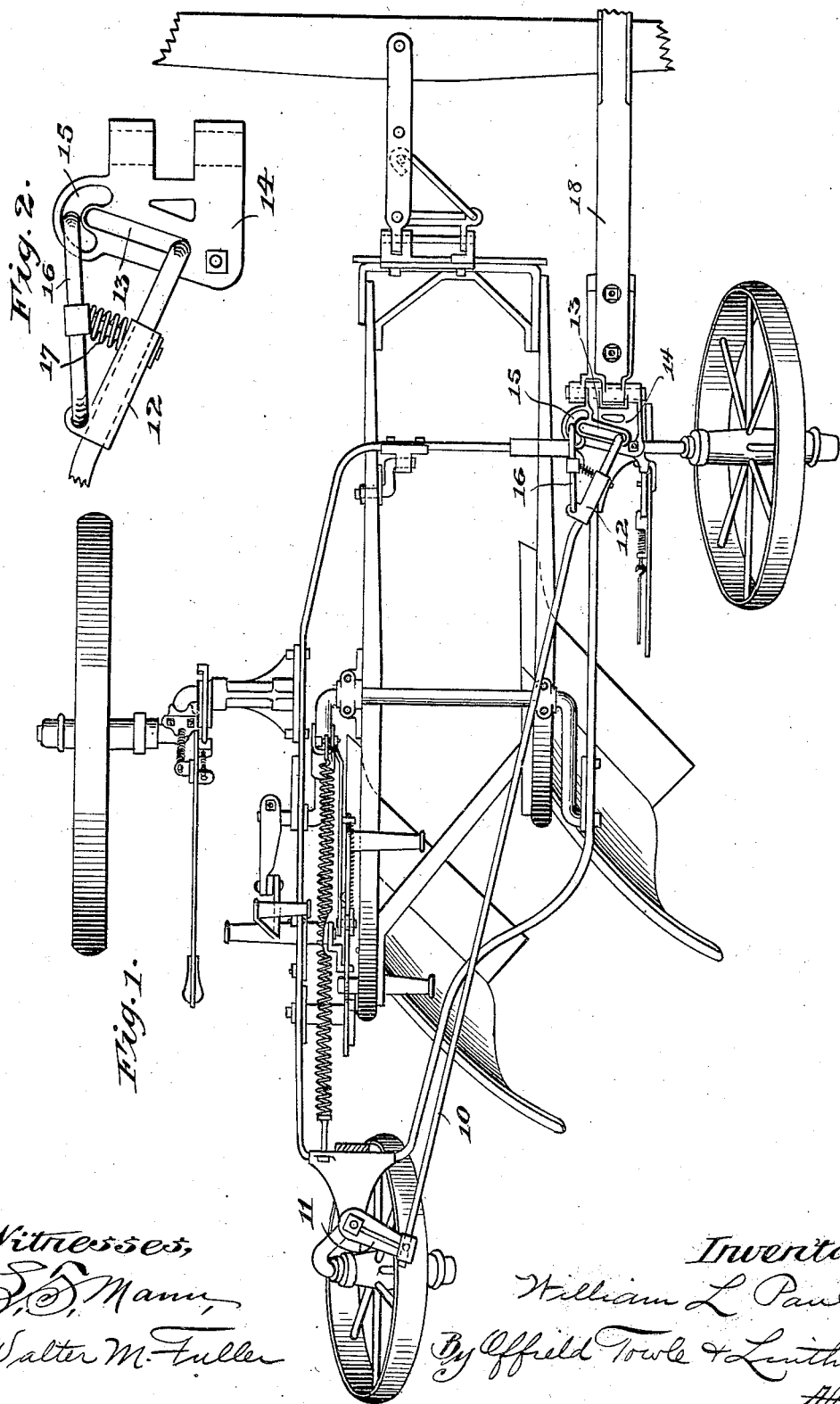

UNITED STATES PATENT OFFICE.

WILLIAM L. PAUL, OF PERU, ILLINOIS, ASSIGNOR TO PERU PLOW & WHEEL COMPANY, OF PERU, ILLINOIS, A CORPORATION OF ILLINOIS.

CASTER-CONTROLLER FOR WHEELED PLOWS.

No. 869,258.        Specification of Letters Patent.        Patented Oct. 29, 1907.

Original application filed June 13, 1906, Serial No. 321,561. Divided and this application filed September 27, 1906. Serial No. 336,471.

*To all whom it may concern:*

Be it known that I, WILLIAM L. PAUL, a citizen of the United States, residing at Peru, in the county of Lasalle and State of Illinois, have invented certain new and useful Improvements in Caster-Controllers for Wheeled Plows, of which the following is a specification.

My invention relates to caster controlling means for wheeled plows, and I provide a simple form of construction whereby the side draft tendency of the plow and the forward thrust of the rear wheel is taken mainly by the axle of the front furrow wheel and is not effective on the pole while the plow is moving forward, and in turning the front and rear wheels are permitted to turn in unison and the plow may be backed, as well as turned with a forward movement.

In the accompanying drawings which form a part of this specification I have illustrated the preferred embodiment of my invention, and on said drawings Figure 1 is a plan of a plow equipped with my improved caster controlling means; and Fig. 2 is a detail plan view of a portion of the caster controlling device.

The caster controlling mechanism comprises a thrust rod 10 connected at its rear end to a crank arm 11 rigid with the rear furrow wheel standard, and at its forward end it passes through a sleeve 12 and has its end turned down to enter a slot 13 in a plate 14 rigidly secured to the front furrow wheel standard. The slotted plate extends away from the front furrow wheel standard, and is provided in its terminal portion with a semi-circular slot 15. Sleeve 12 has pivoted thereto a link 16, having its end turned down to enter the semi-circular slot 15. A spring 17 is interposed between the link 16 and the sleeve 12 normally tending to separate the forward end of the link 16 and the sleeve 12 and rod 10.

In operation and during the forward movement of the plow, the down-turned end of rod 10 will be held in the inner end of slot 13, close to the caster wheel standard, so that the rod 10 becomes practically a rigid thrust member, the thrust being transmitted from the rear caster wheel to the plate 14 near the furrow wheel standard, the thrust being sufficiently near the center to avoid side thrust on the pole or tongue 18. In turning toward the right rod 16 will contact with the rear end of the semi-circular slot 15, and, through the pull exerted on the cranked arm 11 on the rear wheel standard will cause said wheel to turn in unison with the front furrow wheel, the forward end of the rod 10 traveling idly in slot 13. In turning in the opposite direction the down-turned end of the rod 16 will contact with the opposite end of the semi-circular slot thus transmitting the thrust of the rod 10 which will turn the rear caster wheel in the proper direction and in unison with the front furrow wheel. This construction will provide for taking care of the side thrust incident to the normal operation of the plow in the forward movement and connects the two furrow wheels in such manner that they move in unison when turning in either direction.

Although I have described and illustrated but one species of my invention it will be apparent to those skilled in the art that various changes may be made in the structure set forth without departure from my invention, and without sacrificing any of its benefits.

This application is a division of my former application for wheeled plows, Serial Number 321,561, filed June 13, 1906.

I claim:

1. In a wheeled plow, a caster controller comprising a rigid rod eccentrically connected to the rear furrow wheel standard and connected to the front furrow wheel standard, and an arm fastened to said rod, loosely connected to said front furrow wheel standard, and adapted to be brought into action to shift said rod and thereby turn the rear furrow wheel only during turning movements of the plow, substantially as described.

2. In a wheeled plow, a caster controller comprising a rigid rod eccentrically connected to the rear furrow wheel standard and loosely connected to the front furrow wheel standard, and an arm fastened to said rod loosely connected to said front furrow wheel standard and adapted to be brought into action to shift said rod and thereby turn the rear furrow wheel only during turning movements of the plow, substantially as described.

3. In a wheeled plow, a caster controller comprising a rigid rod eccentrically connected to the rear furrow wheel standard and loosely connected to the front furrow wheel standard, and an arm pivoted to said rod, loosely connected to said front furrow wheel standard, and adapted to be brought into action to shift said rod and thereby turn the rear furrow wheel only during turning movements of the plow, substantially as described.

4. In a caster controller for wheeled plows, the combination of a rigid thrust rod eccentrically connected to the rear furrow wheel standard, a plate having two slots secured to the front furrow wheel standard, said thrust rod having a part engaging one of said slots and being normally near the vertical axis of the front furrow wheel standard during forward movement of the plow, and a link pivoted to said thrust rod and engaging the other slot, the ends of said slot being adapted to shift said link and thereby the thrust rod and rear furrow wheel during turning movements of the plow, substantially as described.

5. In a controller for the rear furrow wheel of a wheeled plow, the furrow wheels of which are mounted to turn on substantially vertical axes, the combination of a rigid thrust rod eccentrically connected to the rear furrow wheel standard, a plate having two slots connected to the front furrow wheel standard, said thrust rod having a part engaging one of said slots and being normally near the axis of the front furrow wheel standard during forward movement of the plow, a link pivoted to said thrust rod and engaging the other slot, the ends of said slot being adapted to shift said link and thereby the thrust rod and rear furrow wheel during turning movements of the plow, and a spring interposed between said thrust rod and link tending to separate the same, substantially as described.

6. In a wheeled plow, the combination of a rear furrow-wheel standard, a front furrow-wheel standard, a plate connected to said front furrow-wheel standard and adapted to turn therewith, said plate having two slots, one of which is curved and lies adjacent to the end of the other, which is substantially straight, a rigid rod eccentrically connected to said rear furrow-wheel standard and having a portion fitting in said straight slot, and an arm pivoted to said rod near its front end and having a portion fitted in said curved slot, substantially as described.

7. In a wheeled plow, the combination with the furrow wheels mounted to turn on vertical axes and a controller for the rear furrow wheel, comprising a rigid rod eccentrically connected to the rear furrow wheel standard and loosely connected to the front furrow wheel standard, said latter connection comprising two members, one of which is adapted to receive the thrust of the rear furrow wheel during the forward movement, and the other of said members being adapted to come into action during the turning movement of the plow in either direction, substantially as described.

WILLIAM L. PAUL.

Witnesses:
L. M. RHOADES,
FRED G. DEVEREAUX.